(12) United States Patent
Aliev et al.

(10) Patent No.: US 11,908,453 B2
(45) Date of Patent: Feb. 20, 2024

(54) METHOD AND SYSTEM FOR CLASSIFYING A USER OF AN ELECTRONIC DEVICE

(71) Applicant: YANDEX EUROPE AG, Lucerne (CH)

(72) Inventors: Vladimir Andreevich Aliev, Krasnogorsk (RU); Stepan Aleksandrovich Kargaltsev, Moscow (RU); Artem Valerevich Babenko, Dolgoprudnyy (RU)

(73) Assignee: Direct Cursus Technology L.L.C, Dubai (AE)

( * ) Notice: Subject to any disclaimer, the term of this patent is extended or adjusted under 35 U.S.C. 154(b) by 303 days.

(21) Appl. No.: 17/408,958

(22) Filed: Aug. 23, 2021

(65) Prior Publication Data
US 2022/0254333 A1 Aug. 11, 2022

(30) Foreign Application Priority Data
Feb. 10, 2021 (RU) .................................. 2021103269

(51) Int. Cl.
*G10L 15/06* (2013.01)
*G06F 16/65* (2019.01)
(Continued)

(52) U.S. Cl.
CPC ............ *G10L 15/063* (2013.01); *G06F 16/65* (2019.01); *G06N 20/00* (2019.01); *G10L 15/22* (2013.01); *G10L 2015/0638* (2013.01)

(58) Field of Classification Search
USPC .................................................... 704/1–504
See application file for complete search history.

(56) References Cited

U.S. PATENT DOCUMENTS 8,411,977 B1 * 4/2013 Baluja .................... G06V 10/52
382/240
10,715,604 B1 * 7/2020 Bao ......................... G10L 15/22
(Continued)

FOREIGN PATENT DOCUMENTS

CN 108281138 A 7/2018
CN 110706692 A 1/2020
(Continued)

OTHER PUBLICATIONS

English Abstract for ES1232408 retrieved on Espacenet on Aug. 13, 2021.
(Continued)

*Primary Examiner* — Marcus T Riley
(74) *Attorney, Agent, or Firm* — BCF LLP

(57) ABSTRACT

A method and a system for training a machine-learning algorithm (MLA) to determine a user class of a user of an electronic device are provided. The method comprises: receiving a training audio signal representative of a training user utterance; soliciting, by the processor, a plurality of assessor-generated labels for the training audio signal, the given one of the plurality of assessor-generated labels being indicative of whether the training user is perceived to be one of a first class and a second class; generating an amalgamated assessor-generated label for the training audio signal, the amalgamated assessor-generated label being indicative of a label distribution of the plurality of assessor-generated labels between the first class and the second class; generating a training set of data including the training audio signal and the amalgamated assessor-generated to train the MLA to determine the user class of the user producing an in-use user utterance.

20 Claims, 8 Drawing Sheets

(51) Int. Cl.
*G10L 15/22* (2006.01)
*G06N 20/00* (2019.01)

(56) References Cited

U.S. PATENT DOCUMENTS

| | | | | |
|---|---|---|---|---|
| 2012/0072216 | A1* | 3/2012 | Witzman | G10L 15/26 |
| | | | | 704/240 |
| 2019/0043491 | A1* | 2/2019 | Kupryjanow | G10L 21/0208 |
| 2019/0235831 | A1* | 8/2019 | Bao | G10L 15/19 |
| 2019/0325864 | A1* | 10/2019 | Anders | G10L 15/22 |
| 2019/0362712 | A1* | 11/2019 | Karpukhin | G06F 40/30 |
| 2020/0035222 | A1* | 1/2020 | Sypniewski | G10L 25/18 |
| 2020/0184966 | A1* | 6/2020 | Yavagal | G10L 15/30 |
| 2020/0193987 | A1* | 6/2020 | Minkin | G10L 25/30 |
| 2020/0220935 | A1* | 7/2020 | Bao | G10L 17/22 |
| 2021/0193141 | A1* | 6/2021 | Alipov | G06N 7/01 |
| 2022/0254333 | A1* | 8/2022 | Aliev | G10L 15/063 |

FOREIGN PATENT DOCUMENTS

| | | |
|---|---|---|
| CN | 111210840 A | 5/2020 |
| ES | 1232408 U | 7/2019 |
| RU | 2702980 C1 | 10/2019 |
| WO | 2020044332 A1 | 3/2020 |

OTHER PUBLICATIONS

English Abstract for CN111210840 retrieved on Espacenet on Aug. 13, 2021.

English Abstract for CN108281138 retrieved on Espacenet on Aug. 13, 2021.

English Abstract for CN110706692 retrieved on Espacenet on Aug. 13, 2021.

Sandler et al., "MobileNetV2: The Next Generation of On-Device Computer Vision Networks", Google AI Blog, https://ai.googleblog.com/2018/04/mobilenetv2-next-generation-of-on.html accessed Aug. 13, 2021, pdf 4 pages.

Wikipedia, "Spectrogram", https://en.wikipedia.org/wiki/Spectrogram accessed Aug. 13, 2021, pdf 7 pages.

Wikipedia, "Convolutional neural network", hhttps://en.wikipedia.org/wiki/Convolutional_neural_network accessed Aug. 13, 2021, pdf 32 pages.

Aggarwal et al., "Characterization between Child and Adult voice using Machine Learning Algorithm", International Conference on Computing, Communication and Automation (ICCCA2015), pp. 246-250.

Gautam et al., "Developmental Pattern Analysis and Age Prediction by Extracting Speech Features and Applying Various Classification Techniques", International Conference on Computing, Communication and Automation (ICCCA2015), pp. 83-87.

Nisimura et al., "Public Speech-Oriented Guidance System With Adult and Child Discrimination Capability", ICASSP 2004, pp. 1-433-1-436.

Dat et al., "Application of convolutional neural network for gender and age group recognition from speech", 6th NAFOSTED Conference on Information and Computer Science (NICS), 2019, pp. 489-493.

Shivakumar et al., "Simplified and Supervised I-Vector Modeling for Speaker Age Regression", 2014 IEEE International Conference on Acoustic, Speech and Signal Processing (ICASSP), pp. 4866-4870.

Park et al., "SpecAugment: A Simple Data Augmentation Method for Automatic Speech Recognition", arXiv:1904.08779v3 [eess.AS] Dec. 3, 2019, 6 pages.

Russian Search Report dated Sep. 8, 2022 issued in respect of the counterpart Russian Patent Application No. RU 2021103269.

* cited by examiner

| Type | Title | Genre | Explicit Content | User Class |
|---|---|---|---|---|
| Cartoon | Soul | Fantasy | No | First |
| TV show | Queen's Gambit | Historical drama | Yes | Second |
| Radio | Monte Carlo | Lounge | No | First |
| Film | The Silence | Horror | Yes | Second |
| Film | Love Actually | Romance | No | First |

FIG. 3

METHOD AND SYSTEM FOR CLASSIFYING A USER OF AN ELECTRONIC DEVICE

CROSS-REFERENCE

The present application claims priority to Russian Patent Application No. 2021103269, entitled "METHOD AND SYSTEM FOR CLASSIFYING A USER OF AN ELECTRONIC DEVICE," filed on Feb. 10, 2021, the entirety of which is incorporated herein by reference.

FIELD

The present technology relates to natural language processing in general; and specifically, to a method and a system for classifying a user of an electronic device.

BACKGROUND

Electronic devices, such as smartphones and tablets, are able to access an increasing and diverse number of applications and services for processing and/or accessing different types of information. However, novice users and/or impaired users and/or users may not be able to effectively interface with such devices mainly due to the variety of functions provided by these devices or the inability to use the machine-user interfaces provided by such devices (such as a key board). For example, a user who is driving or a user who is visually-impaired may not be able to use the touch screen key board associated with some of these devices.

Virtual assistant applications have been developed to perform functions in response to such user requests. Such virtual assistant applications may be used, for example, for information retrieval, navigation, but also a wide variety of commands. A conventional virtual assistant application (such as a Siri™ virtual assistant application, an Alexa™ virtual assistant application, and the like) can receive a spoken user utterance in a form of a digital audio signal from an electronic device and perform a large variety of tasks for the user. For example, the user can communicate with the virtual assistant application by providing spoken utterances for asking, for example, what the current weather is like, where the nearest shopping mall is, and the like.

As another example, the user may submit a command to the virtual assistant application to retrieve and reproduce certain media content, such as audio or video media content. For example, to submit such a command, first, the user may be required to provide (that is, utter) a wake-up word or phrase associated with the virtual assistant application— such as "Hey Siri", "Alexa", "OK Google", and the like to activate the virtual assistant application for receiving the command. Further, the user may need to provide the command itself and an indication of the media content they wish to consume, for example, "Play disco music", "I want to watch Queen's Gambit", "Turn on Monte Carlo radio, please", and the like. In response to receiving the command, the virtual assistant application may be configured, for example, to conduct a search, through associated service applications, for the media content and cause reproduction of the media content on the electronic device.

However, some media content may have restrictions for use by users of certain categories. For example, some media content (such as films or songs, for example) may contain language and/or scenes considered explicit or offensive, which may be undesirable to be introduced to a child. In another example, some media content may contain scenes of violence, which may not be appropriate for vulnerable categories of users, such as pregnant women and elderly people.

Thus, in a situation where users of different categories have access to the same electronic device, there is a need for determining a user category of the user submitting a given command to the virtual assistant application and providing/restricting access to the requested media content and/or associated web resources based on the determined user category.

Certain prior art approaches have been proposed to tackle the above-identified technical problem.

Chinese Patent Application Publication No.: 110,706, 692-A published on Jan. 17, 2020 and entitled "Training Method and System of Child Voice Recognition Model" discloses a training method of a child voice recognition model. The method comprises the following steps: acquiring training data; obtaining an unconditionally generated countermeasure network through the training of a baseline acoustic model; inputting random noise data into an unconditional generation countermeasure network to obtain noise enhancement acoustic characteristics; inputting the noise enhancement acoustic features into a baseline acoustic model to obtain a posterior probability soft label corresponding to each frame of noise enhancement acoustic features; training a child speech-enhanced acoustic recognition model using at least the noise-enhanced acoustic features and soft labels and the child speech training data and hard labels as sample training data. An embodiment of the invention also provides a training system of the child voice recognition model. According to the embodiment of the invention, under the condition that the voice of the child is limited, the pronunciation essence of the voice of the child is changed, diversified voices of the child are generated, and the recognition accuracy of the voice recognition model of the child is improved.

United States Application Publication No.: 2019/235,831-A1 published on Aug. 1, 2019, assigned to Amazon Technologies Inc., and entitled "User Input Processing Restriction in a Speech Processing System" discloses techniques for restricting content, available to a speech processing system, from certain users of the system are described. The system may include child devices. When a user (e.g., an adult user or a child user) provides input to a child device, the system may process the input to determine child appropriate content based on the invoked device being a child device. In addition to including child devices, the system may also include child profiles. When a user provides input to a device, the system may identify the user, determine an age of the user, and process the input to determine content appropriate for the user's age. The system may be configured such that child user may be restricted to invoking certain intents, speechlets, skills, and the like. The system may include restrictions that apply uniformly to each child user and/or child device. In addition, the system may include restrictions that are unique to a specific child user and/or device.

United States Patent Application Publication No.: 2020/220,935-A1 published on Jul. 9, 2020, assigned to Amazon Technologies Inc., and entitled "Speech Processing Performed with respect to First and Second User Profiles in a Dialog Session" discloses techniques for implementing a "volatile" user ID are described. A system receives first input audio data and determines first speech processing results therefrom. The system also determines a first user that spoke an utterance represented in the first input audio data. The system establishes a multi-turn dialog session with a first content source and receives first output data from the first content source based on the first speech processing results and the first user. The system causes a device to present first output content associated with the first output data. The system then receives second input audio data and determines second speech processing results therefrom. The system also determines the second input audio data corresponds to the same multi-turn dialog session. The system determines a second user that spoke an utterance represented in the second input audio data and receives second output data from the first content source based on the second speech processing results and the second user. The system causes the device to present second output content associated with the second output data.

SUMMARY

It is an object of the present technology to ameliorate at least some of the inconveniences present in the prior art.

Broadly speaking, certain prior art approaches known to developers of the present technology are directed to using a machine-learning algorithm (MLA) trained to determine the user category of the user submitting the given command to the virtual assistant applications. Typically, according to the prior art approaches, the MLA may be trained based on a training set of data including sample utterances produced by different users, each of which has been assigned with an assessor-generated label indicative of a respective user category as perceived by a respective human assessor.

However, the developers of the present technology have realized that the prior art approaches may provide less accurate determination of the user category, at least under certain circumstances. More specifically, the developers have appreciated that accuracy of determining the user category may be increased, in at least some non-limiting embodiments of the present technology, if the MLA is trained based on a training set of data including a label distribution within a plurality of assessor-generated labels assigned by a respective plurality of human assessors to each of the sample utterances.

Further, each of the sample utterances may be represented, in at least some non-limiting embodiments of the present technology, by a respective time-frequency representation thereof, such as a respective mel-frequency representation, and processed, during the training the MLA, as an image, which is believed to allow for more accurate training of the MLA to classify the users.

Further, the developers have appreciated that injecting noise to the sample utterances, in at least some non-limiting embodiments of the present technology, before soliciting the plurality of assessor-generated labels from the human assessors, may further increase the resulting quality of the classifying and increase robustness of the so-trained MLA to noise in the in-use phase.

Thus, certain non-limiting embodiments of the present technology may allow for more accurate determination of the user category of the user uttering the given command for submission thereof to the virtual assistant application of the electronic device, which may further allow more effectively filtering inappropriate media content for users of specific user categories.

More specifically, in accordance with a first broad aspect of the present technology, there is provided a computer-implemented method of training a machine-learning algorithm (MLA) to determine a user class of a user producing a user utterance. The method is executable on a server including a processor. The method comprising: receiving, by the processor, a training audio signal representative of a training user utterance, the training user utterance having been produced by a training user; soliciting, by the processor, a plurality of assessor-generated labels for the training audio signal, a given one of the plurality of assessor-generated labels having been generated by a respective one of a plurality of human assessors; the given one of the plurality of assessor-generated labels being indicative of whether the training user is perceived, by a respective human assessor, to be one of a first user class and a second user class; generating, by the processor, an amalgamated assessor-generated label for the training audio signal, the amalgamated assessor-generated label being indicative of a label distribution of the plurality of assessor-generated labels between the first user class and the second user class; generating, by the processor, a training set of data including the training audio signal and the amalgamated assessor-generated label; training, by the processor, based on the training set of data, the MLA to determine the user class of the user producing an in-use user utterance.

In some implementations of the method, the method further comprises: segmenting, by the processor, the training audio signal into a plurality of training signal portions; assigning, by the processor, the amalgamated assessor-generated label to each one of the plurality of training signal portions; and wherein the generating, by the processor, the training set of data comprises generating the training set of data based on the plurality of training signal portions.

In some implementations of the method, the method further comprises converting each one of the plurality of training signal portions in a respective time-frequency representation thereof.

In some implementations of the method, the converting comprises applying, to each one of the plurality of training signal portions, a Fourier transform.

In some implementations of the method, the converting further comprises generating, based on the respective time-frequency representation, a respective mel-frequency representation.

In some implementations of the method, the respective mel-frequency representation includes a predetermined number of evenly spaced mel bands.

In some implementations of the method, the amalgamating the plurality of assessor-generated labels comprises determining an average value thereof.

In some implementations of the method, the method further comprises, before soliciting the plurality of assessor-generated labels for the training audio signal, injecting noise into the training audio signal.

In some implementations of the method, the injecting noise includes cancelling at least one predetermined frequency level of the training audio signal.

In some implementations of the method, the injecting the noise includes modulating at least one predetermined frequency level of the training audio signal.

In some implementations of the method, the method further comprises using the MLA to determine the user class of the user producing the in-use user utterance, the in-use user utterance being captured by a speaker device communicatively coupled with the server, the using the MLA comprising: generating, by the processor, based on the in-use user utterance, an in-use audio signal; generating, by the processor, for the in-use audio signal, an in-use time-frequency representation thereof; applying, by the processor, the MLA to the in-use time-frequency representation to generate a distribution parameter between likelihood values respectively indicative of the user producing the in-use user utterance being one of the first user class and the second user class, such that: in response to the distribution parameter being equal to or greater than a predetermined distribution threshold, determining the user as being of the first user class; and in response to the distribution parameter being lower than the predetermined distribution threshold, determining the user as being of the second user class.

In some implementations of the method, the speaker device is configurable to operate in a first operation mode and a second operation mode, and the method further comprises: in response to the determining the user as being of the first user class, causing the speaker device being in the second operation mode to switch into the first operation mode.

In some implementations of the method, the first operation mode is associated with retrieving, by the speaker device, content preselected for users of the first user class; and the second operation mode is associated with retrieving, by the speaker device, content preselected for users of the second user class.

In some implementations of the method, the first user class includes a child and the second user class includes an adult.

In some implementations of the method, the MLA comprises a convolutional neural network.

In accordance with a second broad aspect of the present technology, there is provided a server for training a machine-learning algorithm (MLA) to determine a user class of user producing a user utterance. The server includes: a processor and a non-transitory computer-readable medium comprising instructions. The processor, upon executing the instructions, is configured to: receive a training audio signal representative of a training user utterance, the training user utterance having been produced by a training user; solicit a plurality of assessor-generated labels for the training audio signal, a given one of the plurality of assessor-generated labels having been generated by a respective one of a plurality of human assessors; the given one of the plurality of assessor-generated labels being indicative of whether the training user is perceived, by a respective human assessor, to be one of a first user class and a second user class; generate an amalgamated assessor-generated label for the training audio signal, the amalgamated assessor-generated label being indicative of a label distribution of the plurality of assessor-generated labels between the first user class and the second user class; generate a training set of data including the training audio signal and the amalgamated assessor-generated label; train, based on the training set of data, the MLA to determine the user class of the user producing an in-use user utterance.

In some implementations of the server, the processor is further configured to: segment the training audio signal into a plurality of training signal portions; assign the amalgamated assessor-generated label to each one of the plurality of training signal portions; and wherein the processor is configured to generate the training set of data based on the plurality of training signal portions.

In some implementations of the server, the processor is further configured to convert each one of the plurality of training signal portions in a respective time-frequency representation thereof.

In some implementations of the server, to convert each one of the plurality of training signal portions in the respective time-frequency representation thereof, the processor is configured to apply, to each one of the plurality of training signal portions, a Fourier transform.

In some implementations of the server, the server is communicatively coupled, via a communication network, to a speaker device, and the processor is further configured to use the MLA to determine the user class of the user producing the in-use user utterance captured by the speaker device, by executing: generating, based on the in-use user utterance, an in-use audio signal; generating, for the in-use audio signal, an in-use time-frequency representation thereof; applying the MLA to the in-use time-frequency representation to generate a distribution parameter between likelihood values respectively indicative of the user producing the in-use user utterance being one of the first user class and the second user class, such that: in response to the distribution parameter being equal to or greater than a predetermined distribution threshold, determining the user as being of the first user class; and in response to the distribution parameter being lower than the predetermined distribution threshold, determining the user as being of the second user class.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 3 depicts an example of a media content index database used by a processor of the computer system of FIG. 1 for determining an operation mode of an electronic device present in the networked computing environment of FIG. 2, in accordance with certain non-limiting embodiments of the present technology.

DETAILED DESCRIPTION

Figure 1:
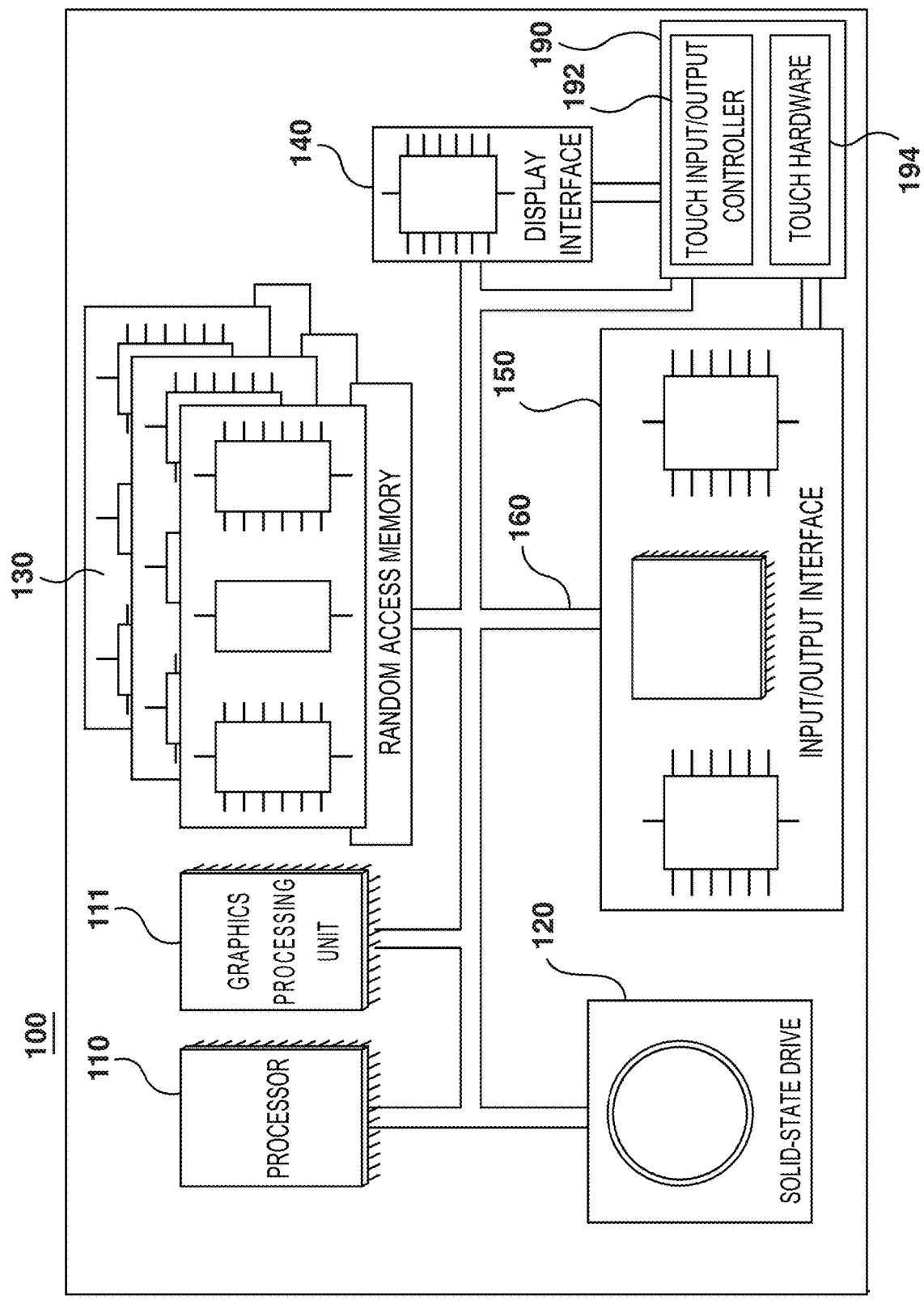
FIG. 1 depicts a schematic diagram of an example computer system for implementing certain non-limiting embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit," may be provided through the use of dedicated hardware as well as hardware capable of executing software in association with appropriate software. When provided by a processor, the functions may be provided by a single dedicated processor, by a single shared processor, and/or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random-access memory (RAM), and/or non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

With reference to FIG. 1, there is depicted a computer system 100 suitable for use with some implementations of the present technology. The computer system 100 comprises various hardware components including one or more single or multi-core processors collectively represented by a processor 110, a graphics processing unit (GPU) 111, a solid-state drive 120, a random-access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the computer system 100 in addition to or instead of the touchscreen 190. In some embodiments, the computer system 100 may comprise one or more microphones (not shown). The microphones may record audio, such as user utterances. The user utterances may be translated to commands for controlling the computer system 100.

It is noted some components of the computer system 100 can be omitted in some non-limiting embodiments of the present technology. For example, the touchscreen 190 can be omitted, especially (but not limited to) where the computer system is implemented as a smart speaker device.

According to implementations of the present technology, the solid-state drive 120 stores program instructions suitable for being loaded into the random-access memory 130 and executed by the processor 110 and/or the GPU 111. For example, the program instructions may be part of a library or an application.

Networked Computing Environment

Figure 2:
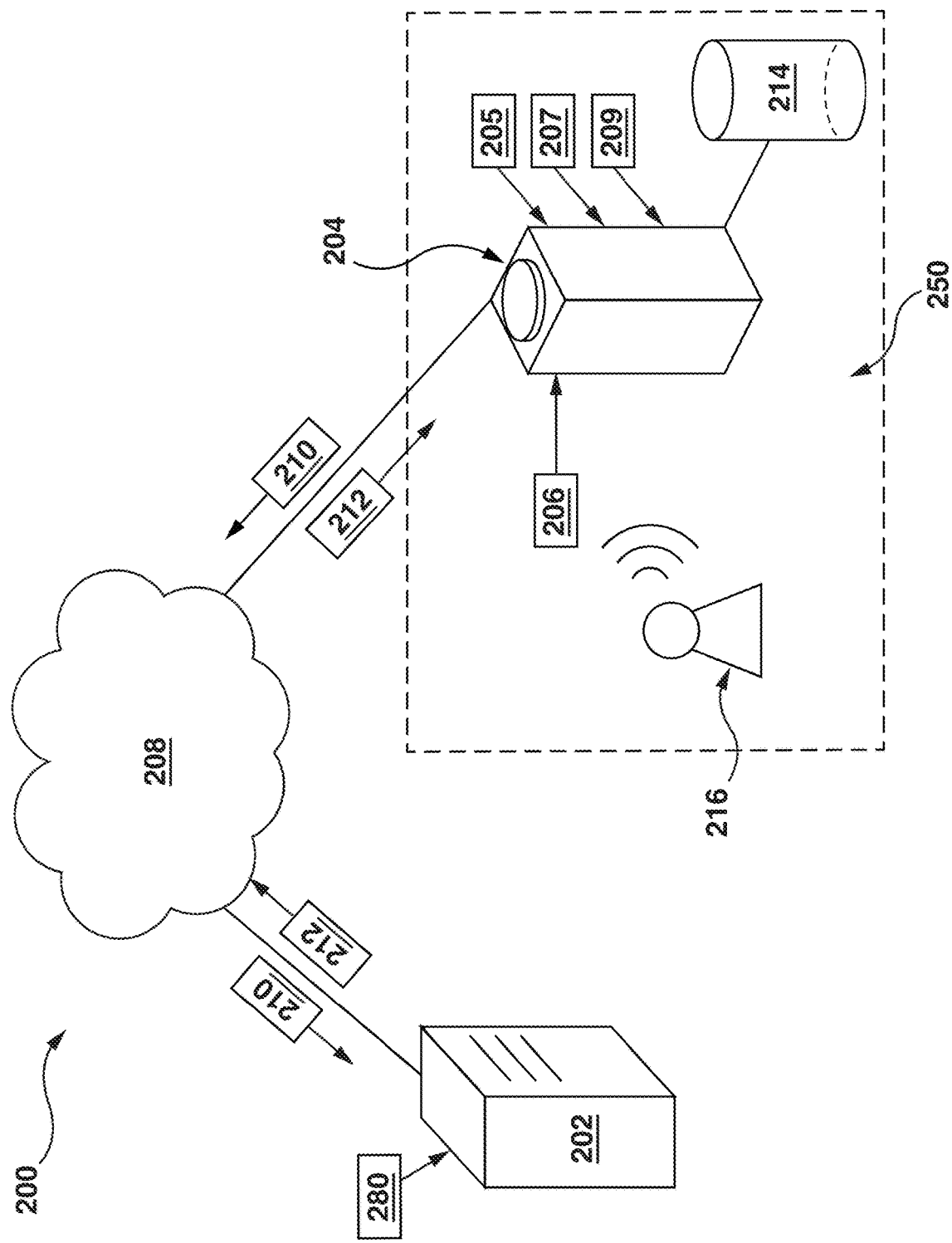
FIG. 2 depicts a networked computing environment suitable for some implementations of the present technology.

With reference to FIG. 2, there is depicted a schematic diagram of a networked computing environment 200 suitable for use with some non-limiting embodiments of the systems and/or methods of the present technology. The networked computing environment 200 comprises a server 202 communicatively coupled, via a communication network 208, to an electronic device 204. In the non-limiting embodiments of the present technology, the electronic device 204 may be associated with a user 216.

In some non-limiting embodiments of the present technology, the electronic device 204 may be any computer hardware that is capable of running a software appropriate to the relevant task at hand. Thus, some non-limiting examples of the electronic device 204 may include personal computers (desktops, laptops, netbooks, etc.), smartphones, and tablets.

The electronic device 204 may comprise some or all components of the computer system 100 depicted in FIG. 1. In certain non-limiting embodiments of the present technology, the electronic device 204 may be a smart speaker (such as for example, Yandex.Station™ provided by Yandex LLC of 16 Lev Tolstoy Street, Moscow, 119021, Russia) comprising the processor 110, the solid-state drive 120 and the random-access memory 130.

In some non-limiting embodiments of the present technology, the electronic device 204 may comprise hardware and/or software and/or firmware (or a combination thereof) such that the processor 110 may be configured to execute a virtual assistant application 205. Generally speaking, the virtual assistant application 205 is capable of hands-free activation in response to one or more "wake-up words" (also known as "trigger words"), and able to perform tasks or services in response to a command received following thereafter. For example, the virtual assistant application 205 may be implemented as an ALISA' virtual assistant application (provided by Yandex LLC of 16 Lev Tolstoy Street, Moscow, 119021, Russia), or other commercial or proprietary virtual assistant applications having been pre-installed on the electronic device 204. As such, the electronic device 204 may receive a command via a microphone 207 implemented within the electronic device 204.

In the non-limiting embodiments of the present technology, the microphone 207 is configured to capture any sound having been produced in a vicinity 250 of the electronic device 204, thereby generating an analog audio signal. For example, the microphone 207 of the electronic device 204 may generate an audio signal 210 in response to a user utterance 206. In some non-limiting embodiments of the present technology, the microphone 207 can be either a stand-alone device communicatively coupled with the electronic device 204 or be part of the electronic device 204.

According to certain non-limiting embodiments of the present technology, the user utterance 206 may include a predetermined wake-up word associated with the virtual assistant application 205. Further, in some non-limiting embodiments of the present technology, the user utterance 206 may comprise a voice command produced by the user 216 following providing the predetermined wake-up word in the vicinity 250 of the electronic device 204.

Thus, in response to receiving and recognizing the predetermined wake-up word, the processor 110 may be configured to cause the virtual assistant application 205 to receive the voice command of the user 216 and execute it.

Thus, according to certain non-limiting embodiments of the present technology, the execution of the received voice command may be associated with the processor 110 executing at least one of a plurality of service applications 209 run by (or otherwise accessible by) one of the electronic device 204 or by the server 202.

Generally speaking, the plurality of service applications 209 corresponds to electronic applications accessible by the processor 110 of the electronic device 204. In some non-limiting embodiments of the present technology, the plurality of service applications 209 comprises at least one service application (not separately depicted) that is operated by the same entity that has provided the afore-mentioned virtual assistant application 205. For example, if the virtual assistant application 205 is the ALISA' virtual assistant application, the plurality of service applications 209 may include a Yandex.Browser™ web browser application, a Yandex.News™ news application, a Yandex.Market™ market application, and the like. Needless to say, the plurality of service applications 209 may also include service applications that are not operated by the same entity that has provided the afore-mentioned virtual assistant application 205, and may comprise for example, social media applications such as Vkontakte™ social media application, video streaming applications such as a Netflix™ video streaming application, and music streaming application such as Spotify™ music streaming application. In some non-limiting embodiments of the present technology, the plurality of service applications 209 may include an electronic service, such as an application for dialogues (such as Yandex.Dialogs™), an application for ordering a taxi, an application for ordering food, and the like. In some non-limiting embodiments of the present technology, the plurality of service applications 209 may be associated with one or more electronic devices linked to the electronic device 204 (not depicted).

In some non-limiting embodiments of the present technology, the server 202 is implemented as a conventional computer server and may comprise some or all of the components of the computer system 100 of FIG. 1. In a specific non-limiting example, the server 202 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 202 is a single server. In alternative non-limiting embodiments of the present technology (not depicted), the functionality of the server 202 may be distributed and may be implemented via multiple servers.

In some non-limiting embodiments of the present technology, the server 202 can be operated by the same entity that has provided the virtual assistant application 205. For example, if the virtual assistant application 205 is the ALISA™ virtual assistant application, the server 202 can also be operated by Yandex LLC of Lev 16 Tolstoy Street, Moscow, 119021, Russia. In alternative embodiments, the server 202 can be operated by an entity different from the one that has provided the aforementioned virtual assistant application 205.

In additional non-limiting embodiments of the present technology, the voice command in the user utterance 206 may be representative of a user request for consuming certain media content, such as a film or a song, as an example. To that end, in some non-limiting embodiments of the present technology, the virtual assistant application 205 may be configured to (1) recognize the voice command in the user utterance 206; (2) determine the user request; (3) submit the user request to respective one(s) of the plurality of service applications 209 configurable for retrieving, via the communication network 208, the media content requested by the user 216; and (4) receive the requested media content for reproduction thereof using at least one of the electronic device 204 and an additional electronic device (not separately depicted) communicatively coupled with the electronic device 204.

In some non-limiting embodiments of the present technology, to recognize the voice command in the user utterance 206 and to determine an association between the received voice command and the respective ones of the plurality of service applications 209, the processor 110 may be configured to cause the virtual assistant application 205 to transmit data indicative of the received voice command to the server 202 for further processing by an automatic speech recognition (ASR) application (not separately depicted) run thereat. In specific non-limiting embodiments of the present technology, the ASR application may be implemented as described in a co-owned U.S. patent application Ser. No. 17/114,059, entitled "METHOD AND SYSTEM FOR PROCESSING USER SPOKEN UTTERANCE", filed on Dec. 7, 2020; the content of which is hereby incorporated by reference in its entirety.

Thus, in some non-limiting embodiments of the present technology, the server 202 may be configured to receive, from the electronic device 204, the voice command for executing at least one of the plurality of service applications 209.

However, in some non-limiting embodiments of the present technology, prior to executing the at least one of the plurality of service applications 209, the server 202 may be configured to determine a user class of the user 216 producing the user utterance 206 in order to further cause the virtual assistant application 205 either to allow or restrict retrieval and reproduction of the requested media content.

Broadly speaking, the user class may be indicative of one or more user-inherent categories associated with the user 216 including, for example, without limitation, a user age, a user gender, a user socio-economic parameter, and the like. To that end, each user-inherent category may include one or more user classes. For example, in some non-limiting embodiments of the present technology, the user age category may include at least two user classes: a first user class and a second user class, wherein the first user class includes a child, and the second user class includes an adult. Also, it should be noted that, in other non-limiting embodiments of the present technology, the user age category may include a third user class of an elderly. In another example, as it may become apparent, the user gender category may also include at least two user classes: male and female.

To that end, in some non-limiting embodiments of the present technology, the electronic device 204 may be configured to operate in one or more operating modes respectively associated with each one of the first user class and the second user class. For example, the electronic device 204 may be configured to operate in a first operating mode and in a second operating mode associated with the processor 110 configured to retrieve media content predetermined for users of the first class and those of the second user class, respectively.

Thus, in some non-limiting embodiments of the present technology, the electronic device 204 may be communicatively coupled (or otherwise have access) to a media content index database 214 including indications of the media content preselected for one of the first user class and the second user class. In some non-limiting embodiments of the present technology, a non-exhaustive list of indications of the media content may include at least one of a type of a given piece of the media content (such as an audio file, a video file, and a radio station, for example), a title of the given piece of the media content, a genre associated with the given piece of the media content (pop/rap, thriller/comedy/ kids, rock/lounge, and the like), an indication of explicit language and/or scenes in the media content, and the like. In alternative non-limiting embodiments of the present technology, media content index database 214 may store an indication of an allowed and/or banned content for each of the user classes. For example, the media content index database 214 may have a flag for offensive language content as "allowed" for adults and "banned" for children.

In some non-limiting embodiments of the present technology, as depicted in FIG. 2, the media content index database 214 is hosted on the electronic device 204 and may be updated, for example, regularly, by the server 202 via the communication network 208. In other non-limiting embodiments of the present technology, the media content index database 214 may be hosted on the server 202 enabling the processor 110 to have access thereto via the communication network 208.

FIG. 3 depicts a schematic diagram of an example implementation of the media content index database 214, in accordance with certain non-limiting embodiments of the present technology.

As it can be appreciated from FIG. 3, the media content index database 214 may include a plurality of records associated with various media content, which the user 216 may wish to consume. Further, the media content index database 214 may include a plurality of predetermined fields including indications of the media content as represented by each one of the plurality of recordings. As mentioned above, although in the depicted embodiments, the plurality of predetermined fields includes five predetermined fields, it should be noted that, in other non-limiting embodiments of the present technology, the plurality of predetermined fields may include, depending on a given piece of the media content, more predetermined fields, such as, without limitation, 'Artists', 'Production', and 'Country', to name a few.

Further, according to certain non-limiting embodiment of the present technology, the plurality of predetermined fields of the media content index database 214 may include a user class field 302, a respective value of which has been pre-assigned to each one of the plurality of records of the media content index database 214 based on at least one respective value of other ones of the plurality of predetermined fields. For example, as a first record 304 of the plurality of records is indicative of a Soul cartoon, a respective value of the user class field 302 pre-assigned thereto is "First", which is indicative that the Soul cartoon, as not including any explicit content, has been pre-selected for the users of the first user class, that is, for children.

In another example, a second record 306 indicative of a The Silence film has been pre-assigned with a respective value "Second" of the user class field 302, which is indicative of the film The Silence having been pre-selected for the users of the second users class, due to one of its genre and including explicit content, and thus should be restricted from the users of the first user class.

Thus, based on at least one of the associated indications, the given piece of the media content may be preselected for one of the first user class, the second user class. As it may be appreciated, the media content preselected for the second user class may also include that preselected for the first user class.

Hence, in some non-limiting embodiments of the present technology, before executing the voice command of the user 216, the processor 110 of the electronic device 204 may be configured to: (1) determine if the user class of the user 216 corresponds to a current operating mode of the electronic device 204; and (2) determine, based on the media content index database 214, if the user request of the provided voice command corresponds to the user class. For example, in the second operating mode, the processor 110 may be configured to execute the voice command provided by the user 216 if it has been determined that the user 216 is of the second user class. In other words, in the second operating mode, the electronic device 204 can be configured not to apply any restrictions for the retrieval and reproduction of the media content if the user class of the user 216 has been determined to be an adult.

However, while the electronic device 204 is working in the second operating mode, the processor has determined that the user 216 is of the first user class (that is, a child), the processor 110 may further be configured to cause switching the electronic device 204 into the first operating mode. Further, the processor 110 may be configured to determine, based on the media content index database 214, that the user request provided via the user utterance 206 does not correspond to the first user class, and further ignore the voice command or, alternatively, provide an error message (for example, "The requested content can not be retrieved" or "The submitted command can not be executed"). In other words, by so doing, the processor 110 may be configured to restrict access to children to the media content preselected for adults.

In additional non-limiting embodiments of the present technology, the switching the electronic device 204 into the first operating mode may comprise the processor 110 causing each one of the plurality of service applications 209 to switch into their respective parental control or other type of a safe mode restricting access to the media content having been predetermined, by respective ones of the plurality of service applications 209, for adult audience only.

Referring back to FIG. 2, in some non-limiting embodiments of the present technology, the user class of the user 216 may be determined using a machine-learning algorithm (MLA) 280 having been trained by the server 202 for purposes of user classification based on training user utterances of various training users. Thus, referring back to FIG. 2, after determining the user class of the user 216, in some non-limiting embodiments of the present technology, the server 202 may be configured to generate a data package 212 including the determined user class for transmission thereof to the electronic device 204.

In the non-limiting embodiments of the present technology, the MLA 280 may be based on neural networks (NN), convolutional neural networks (CNN), decision tree models, gradient boosted decision tree based MLA, association rule learning based MLA, Deep Learning based MLA, inductive logic programming based MLA, support vector machines based MLA, clustering based MLA, Bayesian networks, reinforcement learning based MLA, representation learning based MLA, similarity and metric learning based MLA, sparse dictionary learning based MLA, genetic algorithms based MLA, and the like. For training the MLA 280, the server 202 may employ a supervised-learning approach without departing from the scope of the present technology.

Generally speaking, the server 202 and/or the processor 110 of the electronic device 204 can be said to be executing two respective processes in respect of the MLA 280. A first process of the two processes is a training process, executed by the server 202 and/or the processor 110 of the electronic device 204, where the server 202 is configured to train the MLA 280, based on a training set of data, to determine the user class of the user 216, which will be discussed below with reference to FIGS. 3 and 4. A second process is an in-use process, where the server 202 executes the so-trained MLA 280 for determining the user class of the user 216, which will be described further below with reference to FIGS. 5 and 6, in accordance with certain non-limiting embodiments of the present technology.

According to some non-limiting embodiments of the present technology, both the training process and the in-use process may be executed by the server 202 and/or the processor 110 of the electronic device 204 in the networked computing environment 200 described hereinabove with reference to FIG. 2.

Communication Network

In some non-limiting embodiments of the present technology, the communication network 208 is the Internet. In alternative non-limiting embodiments of the present technology, the communication network 208 can be implemented as any suitable local area network (LAN), wide area network (WAN), a private communication network or the like. It should be expressly understood that implementations for the communication network are for illustration purposes only. How a respective communication link (not separately numbered) between each one of the server 202 and the electronic device 204 and the communication network 208 is implemented will depend, inter alia, on how each one of the server 202 and the electronic device 204 is implemented. Merely as an example and not as a limitation, in those embodiments of the present technology where the electronic device 204 is implemented as a wireless communication device such as a smart speaker, the communication link can be implemented as a wireless communication link. Examples of wireless communication links include, but are not limited to, a 3G communication network link, a 4G communication network link, and the like. The communication network 208 may also use a wireless connection with the server 202 and the electronic device 204.

Training Process

As mentioned above, in accordance with certain non-limiting embodiments of the present technology, the server 202 can be configured to train the MLA 280 based on the training set of data, the process of generating of which will be now described. The description presented below can apply mutatis mutandis to the embodiments where the processor 110 of the electronic device 204 executes the training.

Figure 4:
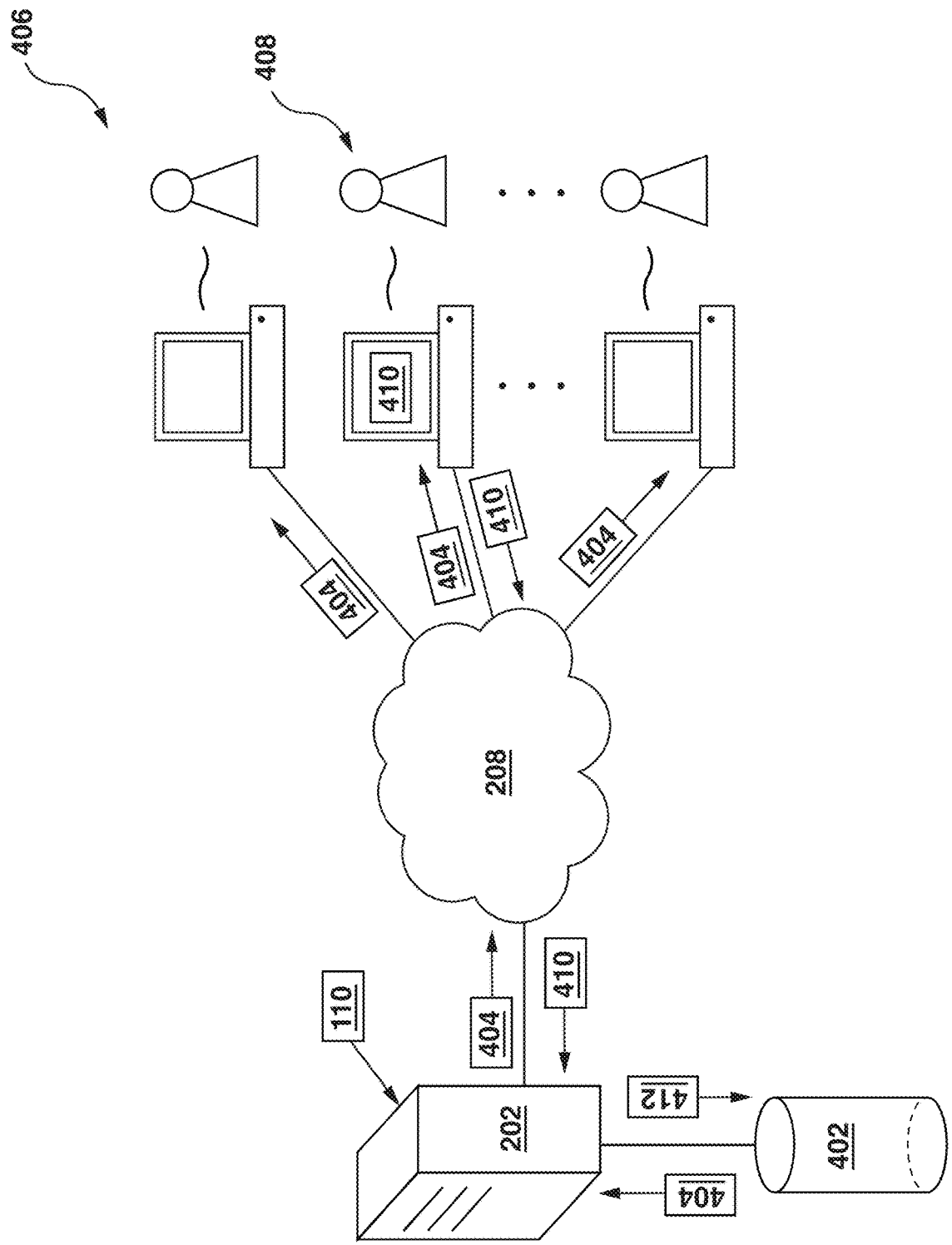
FIG. 4 depicts a schematic diagram of a step for soliciting, by a server present in the networked computing environment of FIG. 2, labels from human assessors for a training user utterance used to generate a training set of data for training a machine-learning algorithm (MLA), in accordance with certain non-limiting embodiments of the present technology.

With reference to FIG. 4, there is depicted a schematic diagram of a step for soliciting, by the server 202, assessor-generated labels for a training audio signal 404 used for generating the training set of data, in accordance with certain non-limiting embodiments of the present technology.

According to some non-limiting embodiments of the present technology, to generate the training set of data, the server 202 may be configured to receive the training audio signal 404 representative of a training user utterance and generated therefrom using an analog-to-digital converter (not separately depicted) of the server 202. For example, the training user utterance may, akin to the user utterance 206, include at least one of the wake-up word associated with the virtual assistant application 205 and a training voice command to be submitted to respective ones of the plurality of service applications 209. The training user utterance may have been produced by a training user, different from the user 216. As it will become apparent, to generate the training set of data, the server 202 may be provided with a plurality of training audio signals (such as hundreds, thousands, or even hundreds of thousands) associated with training users of different user classes, each of which may be processed, according to certain non-limiting embodiments of the present technology, as described hereinbelow.

Further, to receive the training audio signal 404, the server 202 may be communicatively coupled to a training audio signal database 402 storing various training audio signals, similar to the training audio signal 404, generated from respective training user utterances produced by different training users. Alternatively, in some non-limiting embodiments of the present technology, the server 202 may be configured to receive the training audio signal 404 from an external database (not depicted) via the communication network 208.

In some non-limiting embodiments of the present technology, the server 202 may be configured to inject noise in the training audio signal 404. For example, the server 202 may be configured to cancel at least one predetermined frequency level of the training audio signal 404, such that when the training audio signal 404 is being reproduced, a sound corresponding to the at least predetermined frequency level is mute. In other non-limiting embodiments of the present technology, the server 202 may be configured to inject noise in the training audio signal 404 by modulating the at least one predetermined frequency level thereof to distort the sound at the at least one predetermined frequency level when the training audio signal 404 is being reproduced. In yet other non-limiting embodiments of the present technology, the server 202 may be configured to cancel and/or modulate a randomly selected frequency level of the training audio signal 404.

Further, according to certain non-limiting embodiments of the present technology, the server 202 may be configured to transmit the training audio signal 404 to a plurality of human assessors 406 for reproduction thereof on respective assessor electronic devices associated therewith. Broadly speaking, a given assessor electronic device (not separately labelled in FIG. 4) may be configured to (1) receive, over the communication network 208, the training audio signal 404 from the server 202; (2) reproduce the training audio signal 404; and (3) receive inputs from a respective one of the plurality of human assessors 406 in respect of the training audio signal 404 after perceiving thereof. In some non-limiting embodiments of the present technology, the given assessor electronic device may be implemented similar to the electronic device 204 depicted in FIG. 2 and may thus include a personal computer, a smartphone, and the like. To that end, the given assessor electronic device may include some or all components of the computer system 100 depicted in FIG. 1.

Thus, each one of the plurality of human assessors 406 may be asked to provide, using the respective assessor electronic device, a respective assessor-generated label— such as a given human assessor 408 providing a given assessor-generated label 410. According to certain non-limiting embodiments of the present technology, the given assessor-generated label 410 may be indicative of whether the training user associated with the training audio signal 404 is perceived, by the given human assessor 408, to be one of the first user class and the second user class. In other words, turning back to the example, where the first user class comprises a child and the second user class comprises an adult, the given assessor-generated label 410 may be indicative of whether the given human assessor 408 perceives the training user produced the training user utterances of the training audio signal 404 as a child or an adult.

It should be noted that it is not limited how each one of the plurality of human assessors 406 may provide respective assessor-generated labels, and depending on specific implementations, the given human assessor 408 may be instructed to provide the given assessor-generated label 410, for example, in one of the following formats:

- a binary choice of either 'First User Class' or 'Second User Class';
- a scale of "1" to "5", where "1" corresponds to the first user class, and "5" corresponds to the second user class;
- a scale of "1" to "10", where "1" corresponds to the first user class, and "10" corresponds to the second user class;
- etc.

Further, in some non-limiting embodiments of the present technology, the assessor electronic devices (not separately labelled in FIG. 4) may be configured to transmit the so-provided assessor-generated labels to the training audio signal 404, such as the given assessor-generated label 410 provided by the given human assessor 408, to the server 202. The server 202 may further be configured to use the assessor-generated labels to train the MLA 280.

According to certain non-limiting embodiments of the present technology, the server 202 may be configured to generate, based on the assessor-generated labels provided by the plurality of human assessors 406, an amalgamated assessor-generated label 412, which may be stored in the training audio signal database 402 to be assigned to the training audio signal 404 for training the MLA 280.

In some non-limiting embodiments of the present technology, to generate the amalgamated assessor-generated label 412, the server 202 may be configured to determine an average value of all the assessor-generated labels provided by the plurality of human assessors 406. For example, in those embodiments of the present technology where the given assessor-generated label 410 is a binary value where "0" denotes the first user class and "1" denotes the second user class, assume that 40% of the plurality of human assessors 406 have provided, to the training audio signal 404, "0" and 60% of the plurality of human assessors 406 have provided "1", then the amalgamated assessor-generated label 412 has a value of 0.6, which may be indicative of a probability level of the training user being of the second user class.

However, in other non-limiting embodiments of the present technology, the amalgamated assessor-generated label 412 may be indicative of a label distribution between assessor-generated labels respectively representative of the training user being perceived, by the respective one of the plurality of human assessors 406, as being of one of the first user class and the second user class. Thus, continuing with the example above, the server 202 may be configured to determine the label distribution between the first user class and the second user class as being 2:3 and use this value in association with the training audio signal 404 to train the MLA 280.

It should be noted that in those embodiments where the user class of the user 216 includes more than two user classes, the server 202 may be configured to determine the label distribution between all of the user classes. For example, if the user class further includes the third user class (being an elderly, for example, as mentioned above), the server 202 may be configured to determine the value of the amalgamated assessor-generated label 412 as being X:Y:Z, where X, Y, and Z are respectively representative of portions of the assessor-generated labels indicative of the training user being perceived by respective ones of the plurality of human assessors 406 as being one of the first user class, the second user class, and the third user class.

Further, to generate the training set of data, according to certain non-limiting embodiments of the present technology, the server 202 may be configured to segment the training audio signal 404 for further processing thereof.

Figure 5:
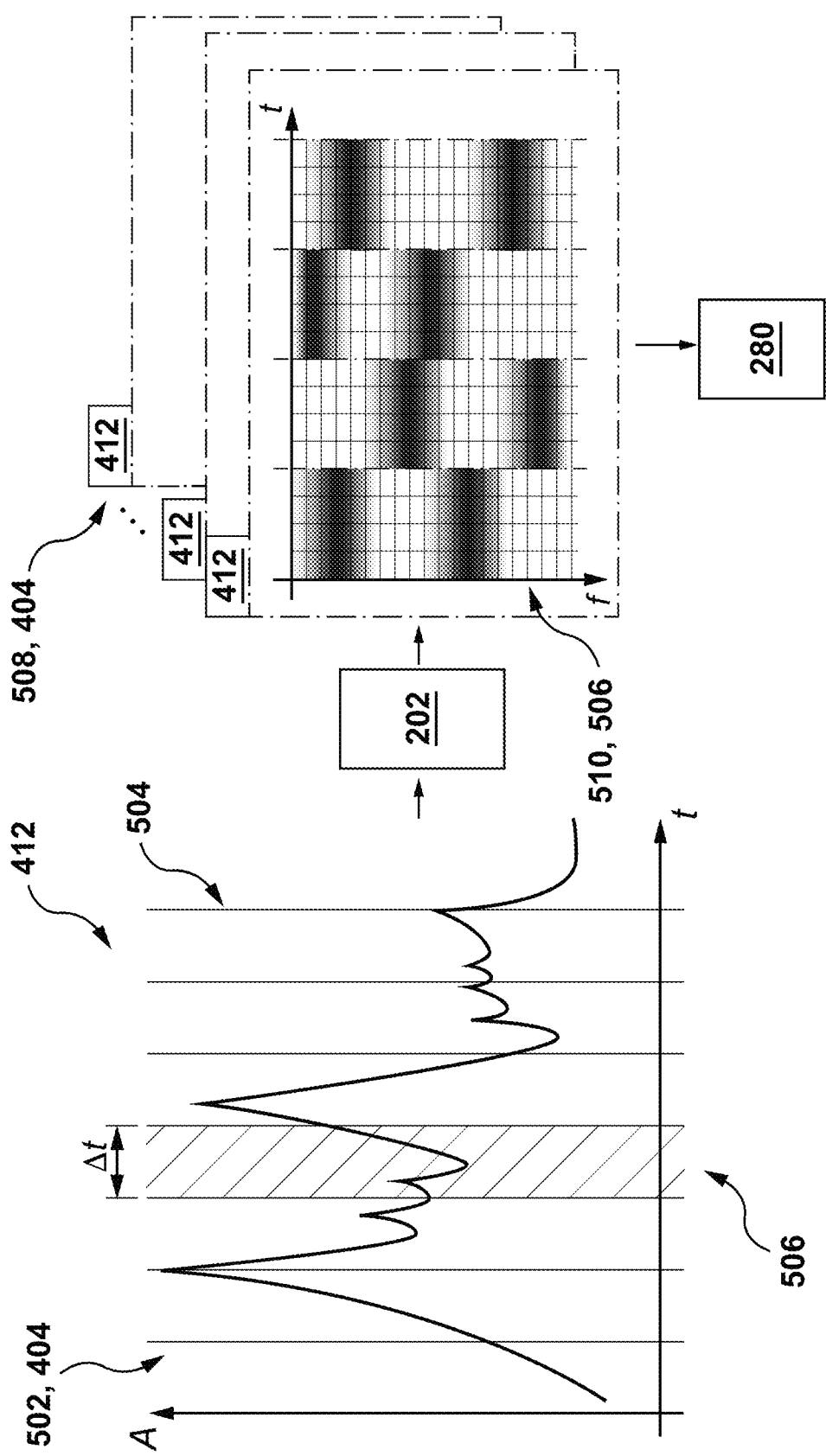
FIG. 5 depicts a schematic diagram of a process for generating, by the server present in the networked computing environment of FIG. 2, time-frequency representations associated with the training user utterance used for generating the training set of data, in accordance with certain non-limiting embodiments of the present technology.

With reference to FIG. 5, there is depicted a schematic diagram of a step of generating, by the server 202, the training set of data based on the training audio signal 404 and the amalgamated assessor-generated label 412, in accordance with certain non-limiting embodiments of the present technology.

In some non-limiting embodiments of the present technology, the server 202 may be configured to use an amplitude-time representation 502 of the training audio signal 404 to segment the training audio signal 404 into a plurality of training portions 504. For example, the server 202 may be configured to segment the training audio signal 404 evenly, based on a desired level of granularity, that is, generate the plurality of training portions 504 of the training audio signal 404 having a predetermined number of training portions of equal duration.

However, in other non-limiting embodiments of the present technology, the server 202 may be configured to segment the training audio signal 404 based on a predetermined time window of a predetermined duration $\Delta t$. The predetermined duration may be determined, for example, to be 0.5 seconds; however, other values thereof such as 0.01 seconds, 0.1 seconds, 0.3 seconds, or 1 second can also be envisioned without departing from the scope of the present technology. In yet other non-limiting embodiments of the present technology, the server 202 may also be configured to segment certain portions of the training audio signal 404 more frequently than other, based, for example, on associated amplitude levels.

Further, the server 202 may be configured to generate, based on each one of the plurality of training portions 504, a plurality of spectrograms 508 associated with the training audio signal 404. Broadly speaking, a given spectrogram 510 associated with a given training portion 506 of the plurality of training portions 504 of the training audio signal 404 is indicative of a respective time-frequency representation thereof. More specifically, the given spectrogram 510 is representative of how frequency components of the given training portion 506 vary over time.

To that end, to generate the given spectrogram 510, according to certain non-limiting embodiments of the present technology, the server 202 may be configured to convert the given training portion 506, from the time domain, represented by the amplitude-time representation 502 of the training audio signal 404, to the frequency domain. In this regard, in some non-limiting embodiments of the present technology, the server 202 may be configured to apply a Discrete Fourier Transform (DFT) to the given training portion 506. How the server 202 may be configured to compute the DFT is not limited and, in various embodiments of the present technology, may include applying one of a Fast Fourier Transform (FFT) algorithm family further including a Prime Factor FFT algorithm, a Bruun's FFT algorithm, a Rader's FFT algorithm, a Bluestein's FFT algorithm, and a Hexagonal FFT, as an example.

It should further be noted that in order to generate the respective time-frequency representation of the given training portion 506, the server 202 may also be configured to apply other discrete transforms including, without limitation: a Generalized DFT, a Discrete-space Fourier transform, a Z-transform, a Modified discrete cosine transform, a Discrete Hartley transform, and the like.

Further, in some non-limiting embodiments of the present technology, the server 202 may be configured to express a frequency spectrum associated with the given spectrogram 510 may in a mel scale. In this regard, in the context of the present technology, the given spectrogram 510 may also be referred as a "mel-frequency representation" or a "mel-spectrogram" associated with the given training portion 506.

Generally speaking, the mel-scale refers to a result of a specific non-linear transformation of the frequency spectrum of the given spectrogram 510 such that the frequency spectrum is separated in a predetermined number of mel bands, which are evenly spaced from each other, thereby approximating the human auditory response. In other words, in terms of pitch levels perceived by the human ear, each of the resulting mel-bands could be perceived to be at an equal distance from an adjacent mel band, which may not be the case with the frequency levels. Accordingly, the server 202 may further be configured to decompose amplitude components of the given training portion 506 within the given spectrogram 510 to correspond to the mel bands.

In some non-limiting embodiments of the present technology, the predetermined number of mel bands may be determined experimentally based on parameters of the MLA 280, and may include, without limitation, 40, 60, 88, 128, or 256 mel bands, as an example.

Finally, in some non-limiting embodiments of the present technology, the server 202 may be configured to assign, to each one of the plurality of spectrograms 508 associated with the training audio signal 404, the amalgamated assessor-generated label 412, thereby generating a plurality of training objects for inclusion thereof in the training set of data.

It should be expressly understood that, according to some non-limiting embodiments of the present technology, the server 202 may be provided with a plurality of training audio signals (such as hundreds, thousands, or even hundreds of thousands), to each of which the server 202 can be configured to apply the approach to generating the plurality of training objects described above in respect of the training audio signal 404 with reference to FIGS. 4 and 5, thereby generating more training objects for the training set of data. Thus, by the server 202 may further be configured to feed the so-generated training set of data to the MLA 280 training the MLA 280 to determine the user class of the user 216, as mentioned above with reference to FIG. 2.

As it can be appreciated, in those embodiments of the present technology where the amalgamated assessor-generated label 412 has been determined as a respective probability level indicative of the training user being one of the first user class and the second user class, in the in-use process, the MLA 280 is configured to determine a likelihood parameter indicative of the user 216 being one of the first user class and the second user class. However, in those embodiments of the present technology where the amalgamated assessor-generated label 412 has been determined as the label distribution between the assessor-generated labels indicative of the training user being perceived as being one of the first user class and the second user class, in the in-use process, the MLA 280 is configured to determine a distribution parameter between respective likelihood values indicative of the user 216 being one of the first user class and the second user class.

In-Use Process

Once the MLA 280 has been trained, it may further be used to determine the user class of the user 216 producing the user utterance 206. To that end, referring back to FIG. 2, according to certain non-limiting embodiments of the present technology, the processor 110 of the electronic device 204 may be configured to (1) capture, using the microphone 207, the user utterance 206; (2) produce the audio signal 210 associated therewith; and (3) transmit the audio signal 210 to the server 202 for further processing.

Figure 6:
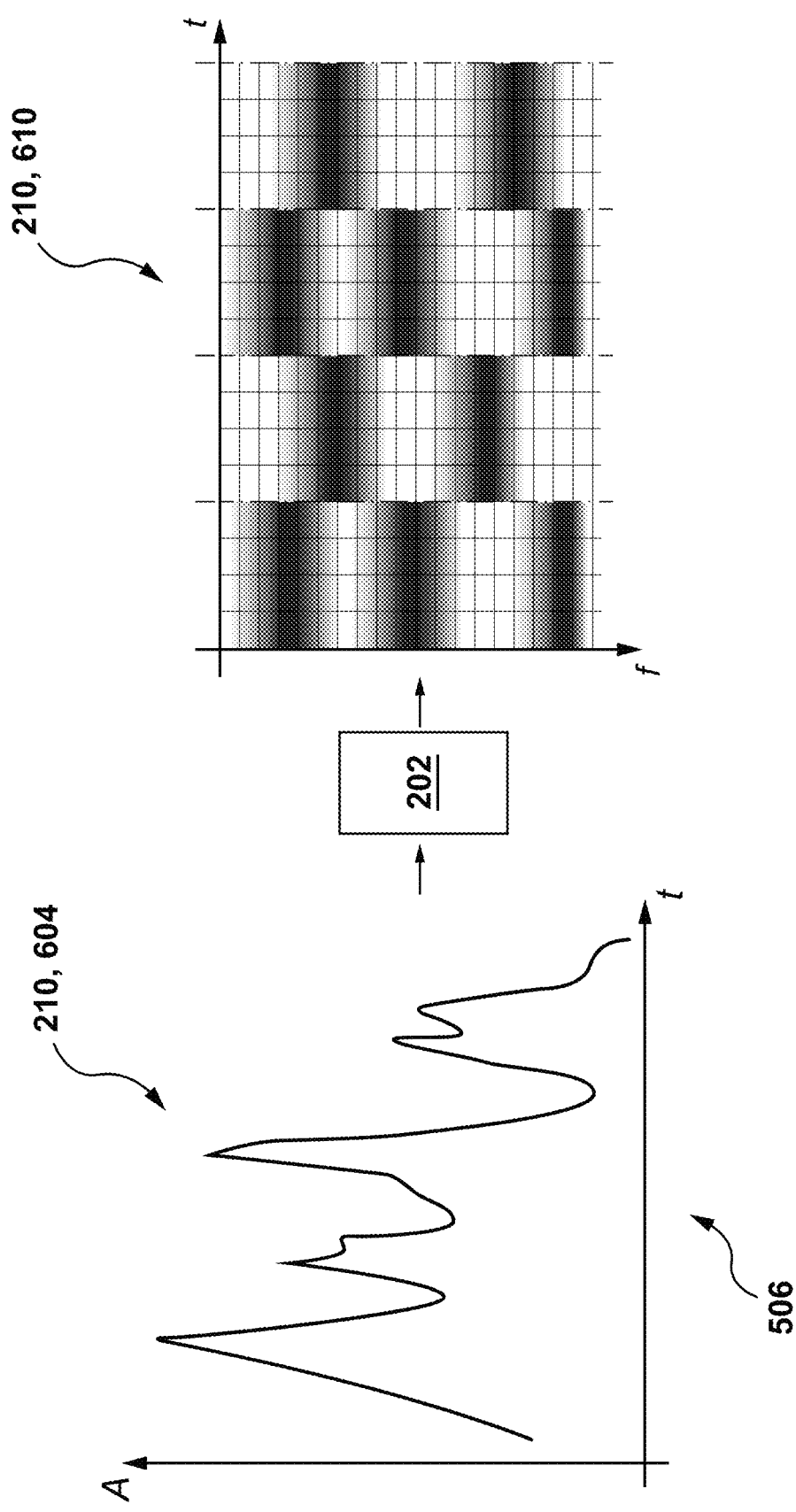
FIG. 6 depicts a schematic diagram of a process for generating, by the server present in the networked computing environment of FIG. 2, a time-frequency representation of an in-use user utterance produced by a user of the electronic device present in FIG. 2, in accordance with certain non-limiting embodiments of the present technology.

With reference to FIG. 6, there is depicted a schematic diagram of a step of the server 202 processing the audio signal 210, in accordance with certain non-limiting embodiments of the present technology.

In some non-limiting embodiments of the present technology, upon receiving the audio signal 210, the server 202 may be configured to generate an in-use amplitude-time representation 604 thereof. Further, the server 202 may be configured to generate, based on the in-use amplitude-time representation 604, an in-use time-frequency representation 610 of the audio signal 210.

To that end, in some non-limiting of the present technology, similar to the generating each one of the plurality of spectrograms 508 associated with the training audio signal 404, the server 202 may be configured to apply the DFT to the in-use amplitude-time representation 604 using one of the family of FFT algorithms. In other non-limiting embodiments of the present technology, to generate the in-use time-frequency representation 610 of the audio signal 210, the server 202 may be configured to apply a Short-Time Fourier transform (STFT) to the in-use amplitude-time representation 604. Broadly speaking, the STFT comprises a sequence of Fourier transforms on each of shorter time segments, so-called "time windows" stacked along the time axis associated with the audio signal 210.

It should be noted that a format of the in-use time-frequency representation 610 of the audio signal 210 should generally correspond to that of the given spectrogram 510 associated with the training audio signal 404. Thus, in those embodiments where the frequency spectrum of the given spectrogram 510 is expressed in frequency levels (that is, in Hertz), a frequency spectrum of the in-use time-frequency representation 610 should also be expressed in frequency levels. Further, in those embodiments where the frequency spectrum of the given spectrogram 510 is expressed in mel bands, the frequency spectrum of the in-use time-frequency representation 610 should also be expressed in mel bands.

Figure 7:
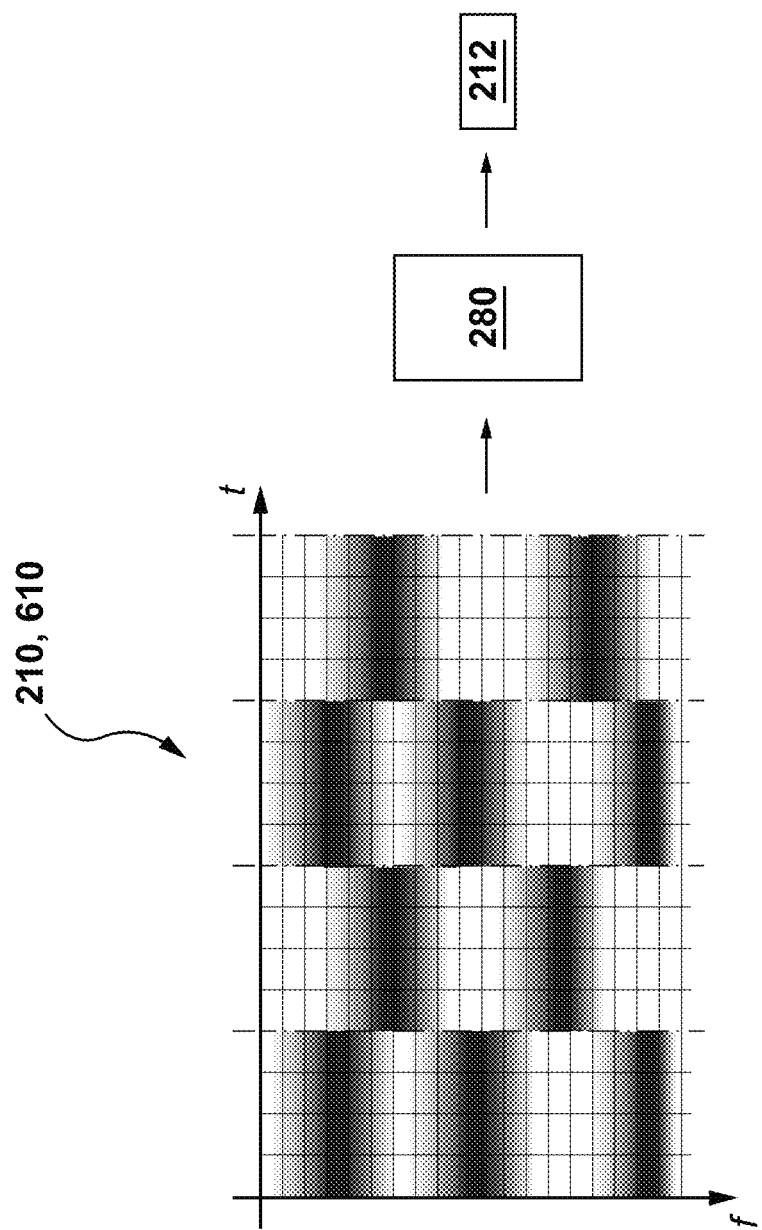
FIG. 7 depicts a schematic diagram of a process of applying, by server present in the networked computing environment of FIG. 2, the MLA, trained based on the training set of data, to the time-frequency representation associated with the in-use user utterance, in accordance with certain non-limiting embodiments of the present technology.

Further, as best illustrated in FIG. 7, in accordance with certain non-limiting embodiments of the present technology, the server 202 may further be configured to apply the MLA 280, trained based on the training set of data as described above, to the in-use time-frequency representation 610 of the audio signal 210 to determine the user class of the user 216 of the electronic device 204 as being one of the first user class and the second user class. By so doing, the server 202 may be configured to generate the data package 212 for transmission thereof to the electronic device 204 for further use.

As noted hereinabove, in some non-limiting embodiments of the present technology, after the training process, the MLA 280 may be executed on the electronic device 204, by the processor 110. In these embodiments, the in-use amplitude-time representation 604 and the in-use time-frequency representation 610 of the audio signal 210 may also be generated by the processor 110 using similar approaches as described with reference to FIG. 6 in respect of the server 202. Further, the processor 110 may be configured to apply the MLA 280 to the in-use time-frequency to determine the user class of the user 216.

Further, as alluded to above, having received the data package 212, the processor 110 of the electronic device 204 may be configured to execute one or more predetermined actions. For example, let it be assumed that the MLA 280 has determined that the user class of the user 216 is the first user class, and the electronic device 204 is currently operating in the second operating mode, then in response to receiving the data package 212, the processor 110 may be configured to cause the electronic device 204 to switch into the first operating mode restricting access to certain media content from the user 216.

Method

Figure 8:
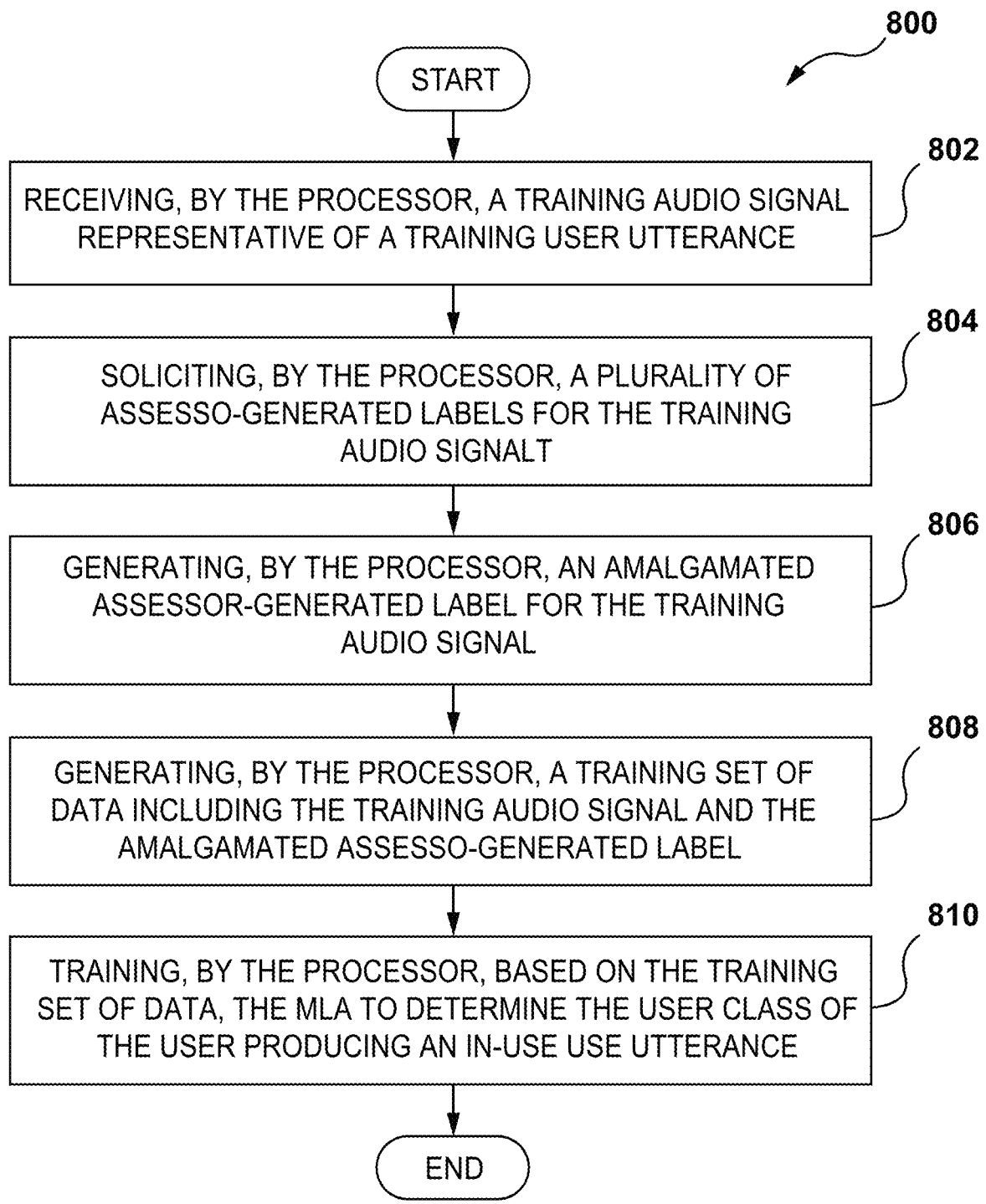
FIG. 8 depicts a flowchart of a method for determining a user class of the user of the electronic device present in FIG. 2, in accordance with certain non-limiting embodiments of the present technology.

Given the architecture and the examples provided hereinabove, it is possible to execute a method for training and MLA (such as the MLA 280 of the networked computing environment 200) to determine a user class of a user of an electronic device, such as the user 216 of the electronic device 204. With reference to FIG. 8, there is depicted a flowchart of a method 800, according to the non-limiting embodiments of the present technology. The method 800 can be executed by the server 202.

Step 802: Receiving, by the Processor, a Training Audio Signal Representative of a Training User Utterance The method 800 commences at step 802 where the server 202 can be configured to receive, from the training audio signal database 402, the training audio signal 404. As described above with reference to FIG. 4, according to certain non-limiting embodiments of the present technology, the training audio signal 404 may have been generated based on the training user utterance produced by the training user, different from the user 216.

In some non-limiting embodiments of the present technology, at step 802, the server 202 may be configured to inject noise in the training audio signal 404 by cancelling and/or modifying at least one frequency level of the training audio signal 404. In some non-limiting embodiments of the present technology, the server 202 may be configured to determine the at least one frequency level randomly.

The method 800 thus advances to step 804.

Step 804: Soliciting, by the Processor, a Plurality of Assessor-Generated Labels for the Training Audio Signal At step 804, the server 202 may be configured to transmit, via the communication network 208, the training audio signal 404 to the plurality of human assessors 406, each of whom may reproduce the training audio signal 404 using a respective assessor electronic device and assign thereto a respective assessor-generated label—such as the given assessor-generated label 410 provided by the given human assessor 408.

As described above with reference to FIG. 4, according to certain non-limiting embodiments of the present technology, the given assessor-generated label 410 may be indicative of whether the given human assessor 408 perceives, based on the training audio signal 404, the training user as being of one of the first user class and the second user class.

Thus, such assessor-generated labels for the training audio signal 404 provided by the plurality of human assessors 406 can further be transmitted to the server 202 for further processing.

The method 800 hence proceeds to step 806.

Step 806: Generating, by the Processor, an Amalgamated Assessor-Generated Label for the Training Audio Signal At step 806, according to certain non-limiting embodiments of the present technology, the server 202 may be configured to receive the assessor-generated labels from the plurality of human assessors 406 and generate the amalgamated assessor-generated label 412.

In some non-limiting embodiments of the present technology, to generate the amalgamated assessor-generated label 412, the server 202 may be configured to determine an average value of all the assessor-generated labels provided by the plurality of human assessors 406. Thus, in these embodiments, the amalgamated assessor-generated label 412 may be indicative of a probability level of the training user being one of the first user class and the second user class.

In other non-limiting embodiments of the present technology, the server 202 may be configured to determine the amalgamated assessor-generated label 412 as a label distribution value between assessor-generated labels respectively representative of the training user being perceived, by the respective one of the plurality of human assessors 406, as being of one of the first user class and the second user class.

The method 800 hence advances to step 808.

Step 808: Generating, by the Processor, a Training Set of Data Including the Training Audio Signal and the Amalgamated Assessor-Generated Label At step 808, upon generation of the amalgamated assessor-generated label 412, the server 202 may be configured to proceed to generate the training set of data based on the training audio signal 404.

To that end, as described above with reference to FIG. 5, the server 202 may be configured to segment the training audio signal 404 into the plurality of training portions 504. Further, the server may be configured to generate, for each one of the plurality of training portions 504, the plurality of spectrograms 508—such as the given spectrogram 510 associated with the given training portion 506.

In some non-limiting embodiments of the present technology, the server 202 may be configured to generate the given spectrogram 510 by applying the DFT to the given training portion 506.

In some non-limiting embodiments of the present technology, the server 202 may be configured to express the frequency spectrum associated with the given spectrogram 510 in the mel scale including a predetermined number of evenly spaced mel bands.

Thus, having generated the plurality of spectrograms 508, the server 202 may be configured to assign to each one of them the amalgamated assessor-generated label 412, thereby generating training objects for inclusion thereof in the training set of data. Further, as noted above, the server 202 may be configured to apply steps 802 to 808 to other training audio signals associated with training users of different user classes to generate more training objects for the training set of data.

The method 800 thus advances to step 810.

Step 810: Training, by the Processor, Based on the Training Set of Data, the MLA to Determine the User Class of the User Producing an In-Use User Utterance At step 810, according to certain non-limiting embodiments of the present technology, the server 202 may be configured to feed the training set of data to the MLA 280 to train the MLA 280 to determine the user class of the user 216 producing the user utterance 206 as being one of the first user class and the second user class.

In some non-limiting embodiments of the present technology, the MLA 280 comprises a convolutional neural network.

Further, the server 202 may be configured to use the MLA 280 to determine the user class of the user 216. To that end, as described above with reference to FIG. 6, the server 202 may be configured to receive the audio signal 210, generated by the processor 110 of the electronic device 204 in response to capturing the user utterance 206, and process it for further application of the MLA 280.

More specifically, the server 202 may be configured to generate the in-use time frequency representation 610 of the audio signal 210 in a fashion similar to that described above with respect to the given spectrogram 510. Further, the server 202 may be configured to apply the MLA 280 to the in-use time-frequency representation 610 and generate the data package 212 including the user class of the user 216.

Further, as described above with reference to FIG. 7, the server 202 may be configured to transmit the data package 212 to the electronic device 204; and the processor 110 of the electronic device 204 may be configured to receive the data package 212 and, depending on the determined user class, execute one or more predetermined actions. For example, if the data package 212 includes data indicative of the user class of the user 216 being the first user class (that is, a child), and the electronic device 204 is currently operating in the second operating mode (associated with the second user class, that is, an adult), then in response to receiving the data package 212, the processor 110 may be configured to cause the electronic device 204 to switch into the first operating mode restricting access to certain media content from the user 216.

Thus, certain embodiments of the method 800, due to the training of the MLA 280 based on the amalgamated assessor-generated label 412 and injecting noise in the training audio signal 404, may allow for better accuracy of determining the user class of the user 216 of the electronic device 204 and, as a result, more stable operating performance thereof.

The method 800 thus terminates.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for training a machine-learning algorithm (MLA) to determine a user class of a user producing a user utterance, the method being executable on a server including a processor, the method comprising:
   receiving, by the processor, a training audio signal representative of a training user utterance,
      the training user utterance having been produced by a training user;
   soliciting, by the processor, a plurality of assessor-generated labels for the training audio signal,
      a given one of the plurality of assessor-generated labels having been generated by a respective one of a plurality of human assessors;
      the given one of the plurality of assessor-generated labels being indicative of whether the training user is perceived, by a respective human assessor, to be one of a first user class and a second user class;
   generating, by the processor, an amalgamated assessor-generated label for the training audio signal,
      the amalgamated assessor-generated label being indicative of a label distribution of the plurality of assessor-generated labels between the first user class and the second user class;
   generating, by the processor, a training set of data including the training audio signal and the amalgamated assessor-generated label;
   training, by the processor, based on the training set of data, the MLA to determine the user class of the user producing an in-use user utterance.

2. The method of claim 1, further comprising:
   segmenting, by the processor, the training audio signal into a plurality of training signal portions;
   assigning, by the processor, the amalgamated assessor-generated label to each one of the plurality of training signal portions; and wherein the generating, by the processor, the training set of data comprises generating the training set of data based on the plurality of training signal portions.

3. The method of claim 2, further comprising converting each one of the plurality of training signal portions in a respective time-frequency representation thereof.

4. The method of claim 3, wherein the converting comprises applying, to each one of the plurality of training signal portions, a Fourier transform.

5. The method of claim 4, wherein the converting further comprises generating, based on the respective time-frequency representation, a respective mel-frequency representation.

6. The method of claim 5, wherein the respective mel-frequency representation includes a predetermined number of evenly spaced mel bands.

7. The method of claim 1, wherein the amalgamating the plurality of assessor-generated labels comprises determining an average value thereof.

8. The method of claim 1, further comprising, before soliciting the plurality of assessor-generated labels for the training audio signal, injecting noise into the training audio signal.

9. The method of claim 8, wherein the injecting noise includes cancelling at least one predetermined frequency level of the training audio signal.

10. The method of claim 8, wherein the injecting the noise includes modulating at least one predetermined frequency level of the training audio signal.

11. The method of claim 1, further comprising using the MLA to determine the user class of the user producing the in-use user utterance, the in-use user utterance being captured by a speaker device communicatively coupled with the server, the using the MLA comprising:
   generating, by the processor, based on the in-use user utterance, an in-use audio signal;
   generating, by the processor, for the in-use audio signal, an in-use time-frequency representation thereof;
   applying, by the processor, the MLA to the in-use time-frequency representation to generate a distribution parameter between likelihood values respectively indicative of the user producing the in-use user utterance being one of the first user class and the second user class, such that:
in response to the distribution parameter being equal to or greater than a predetermined distribution threshold, determining the user as being of the first user class; and
in response to the distribution parameter being lower than the predetermined distribution threshold, determining the user as being of the second user class.

12. The method of claim 11, wherein the speaker device is configurable to operate in a first operation mode and a second operation mode, and the method further comprises:
in response to the determining the user as being of the first user class, causing the speaker device being in the second operation mode to switch into the first operation mode.

13. The method of claim 12, wherein:
the first operation mode is associated with retrieving, by the speaker device, content preselected for users of the first user class; and
the second operation mode is associated with retrieving, by the speaker device, content preselected for users of the second user class.

14. The method of claim 1, wherein the first user class includes a child and the second user class includes an adult.

15. The method of claim 1, wherein the MLA comprises a convolutional neural network.

16. A server for training a machine-learning algorithm (MLA) to determine a user class of user producing a user utterance, the server including:
a processor;
a non-transitory computer-readable medium comprising instructions;
the processor, upon executing the instructions, being configured to:
receive a training audio signal representative of a training user utterance,
the training user utterance having been produced by a training user;
solicit a plurality of assessor-generated labels for the training audio signal,
a given one of the plurality of assessor-generated labels having been generated by a respective one of a plurality of human assessors;
the given one of the plurality of assessor-generated labels being indicative of whether the training user is perceived, by a respective human assessor, to be one of a first user class and a second user class;
generate an amalgamated assessor-generated label for the training audio signal,
the amalgamated assessor-generated label being indicative of a label distribution of the plurality of assessor-generated labels between the first user class and the second user class;
generate a training set of data including the training audio signal and the amalgamated assessor-generated label;
train, based on the training set of data, the MLA to determine the user class of the user producing an in-use user utterance.

17. The server of claim 16, wherein the processor is further configured to:
segment the training audio signal into a plurality of training signal portions;
assign the amalgamated assessor-generated label to each one of the plurality of training signal portions; and
generate the training set of data based on the plurality of training signal portions.

18. The server of claim 17, wherein the processor is further configured to convert each one of the plurality of training signal portions in a respective time-frequency representation thereof.

19. The server of claim 18, wherein to convert each one of the plurality of training signal portions in the respective time-frequency representation thereof, the processor is configured to apply, to each one of the plurality of training signal portions, a Fourier transform.

20. The server of claim 16, wherein the server is communicatively coupled, via a communication network, to a speaker device, and the processor is further configured to use the MLA to determine the user class of the user producing the in-use user utterance captured by the speaker device, by executing:
generating, based on the in-use user utterance, an in-use audio signal;
generating, for the in-use audio signal, an in-use time-frequency representation thereof;
applying the MLA to the in-use time-frequency representation to generate a distribution parameter between likelihood values respectively indicative of the user producing the in-use user utterance being one of the first user class and the second user class, such that:
in response to the distribution parameter being equal to or greater than a predetermined distribution threshold, determining the user as being of the first user class; and
in response to the distribution parameter being lower than the predetermined distribution threshold, determining the user as being of the second user class.

* * * * *